(12) United States Patent
De Rick

(10) Patent No.: US 12,331,529 B2
(45) Date of Patent: *Jun. 17, 2025

(54) PANEL

(71) Applicant: FLOORING INDUSTRIES LIMITED, SARL, Bertrange (LU)

(72) Inventor: Jan De Rick, Geraardsbergen (BE)

(73) Assignee: UNILIN, BV, Wielsbeke (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,492

(22) Filed: Sep. 21, 2023

(65) Prior Publication Data

US 2024/0011304 A1 Jan. 11, 2024

Related U.S. Application Data

(63) Continuation of application No. 18/050,148, filed on Oct. 27, 2022, now Pat. No. 11,859,394, which is a
(Continued)

(51) Int. Cl.
*E04F 15/04* (2006.01)
*B32B 3/06* (2006.01)
(Continued)

(52) U.S. Cl.
CPC .............. *E04F 15/042* (2013.01); *B32B 3/06* (2013.01); *B32B 7/12* (2013.01); *B32B 17/065* (2013.01); *B32B 17/067* (2013.01); *B32B 19/06* (2013.01); *B32B 27/304* (2013.01); *E04F 13/0866* (2013.01); *E04F 13/0871* (2013.01); *E04F 13/0894* (2013.01); *E04F 13/10* (2013.01); *E04F 13/16* (2013.01); *E04F 15/02038* (2013.01); *E04F 15/04* (2013.01); *E04F 15/102* (2013.01); *E04F 15/107* (2013.01); *B32B 2307/412* (2013.01); *B32B 2307/414* (2013.01); *B32B 2419/04* (2013.01);
(Continued)

(58) Field of Classification Search
CPC . E04F 15/042; E04F 13/0866; E04F 13/0871; E04F 13/0894; E04F 13/10; E04F 13/16; E04F 15/102; E04F 15/107; B32B 2307/412; B32B 2307/414; B32B 2419/04
See application file for complete search history.

(56) References Cited

U.S. PATENT DOCUMENTS 8,071,193 B2    12/2011    Windmoller
9,453,349 B2    9/2016    Pallon
(Continued)

FOREIGN PATENT DOCUMENTS

CA    2980948 A1    10/2016
CN    2642917 Y    9/2004
(Continued)

OTHER PUBLICATIONS

International Search Report from PCT Application No. PCT/IB2018/057059, Dec. 19, 2018.

*Primary Examiner* — Patrick J Maestri
(74) *Attorney, Agent, or Firm* — Workman Nydegger

(57) ABSTRACT

A floor, wall or ceiling panel comprises a core and a decorative top layer provided on the core. The core comprises a magnesium oxide-based board material, and wherein the aforementioned panel, on at least two opposite edges, is provided with coupling means allowing that two of such panels can be interlocked at the respective edges.

20 Claims, 3 Drawing Sheets

Related U.S. Application Data continuation of application No. 16/651,419, filed as application No. PCT/IB2018/057059 on Sep. 14, 2018, now Pat. No. 11,525,268.

(60) Provisional application No. 62/564,499, filed on Sep. 28, 2017.

(51) Int. Cl.

| | | |
|---|---|---|
| *B32B 7/12* | (2006.01) | |
| *B32B 17/06* | (2006.01) | |
| *B32B 19/06* | (2006.01) | |
| *B32B 27/30* | (2006.01) | |
| *E04F 13/08* | (2006.01) | |
| *E04F 13/10* | (2006.01) | |
| *E04F 13/16* | (2006.01) | |
| *E04F 15/02* | (2006.01) | |
| *E04F 15/10* | (2006.01) | |

(52) U.S. Cl.
CPC ....... *B32B 2451/00* (2013.01); *B32B 2607/02* (2013.01); *E04F 2201/0146* (2013.01); *E04F 2201/0153* (2013.01); *E04F 2201/0535* (2013.01); *E04F 2201/0588* (2013.01)

(56) References Cited

U.S. PATENT DOCUMENTS

| | | |
|---|---|---|
| 2008/0138560 A1 | 6/2008 | Windmoller |
| 2013/0062006 A1 | 3/2013 | Meersseman et al. |
| 2013/0067842 A1 | 3/2013 | Meersseman et al. |
| 2014/0134402 A1 | 5/2014 | Pallon |
| 2017/0268118 A1 | 9/2017 | Ono et al. |

FOREIGN PATENT DOCUMENTS

| | | |
|---|---|---|
| CN | 2755204 Y | 2/2006 |
| CN | 101914984 A | 12/2010 |
| CN | 202081610 U | 12/2011 |
| CN | 103429421 A | 12/2013 |
| CN | 104831863 A | 8/2015 |
| CN | 105254272 A | 1/2016 |
| CN | 106930505 A | 7/2017 |
| DE | 102012000468 A1 | 7/2013 |
| EP | 1875011 A1 | 1/2008 |
| EP | 1938936 A1 | 7/2008 |
| EP | 1938963 A1 | 7/2008 |
| EP | 1938963 B1 | 2/2010 |
| EP | 2248665 A1 | 11/2010 |
| RU | 2358076 C1 | 6/2009 |
| WO | 9747834 A1 | 12/1997 |
| WO | 2012061300 A2 | 5/2012 |
| WO | 2013179260 A1 | 12/2013 |
| WO | 2016154667 A1 | 10/2016 |
| WO | 2016156506 A1 | 10/2016 |

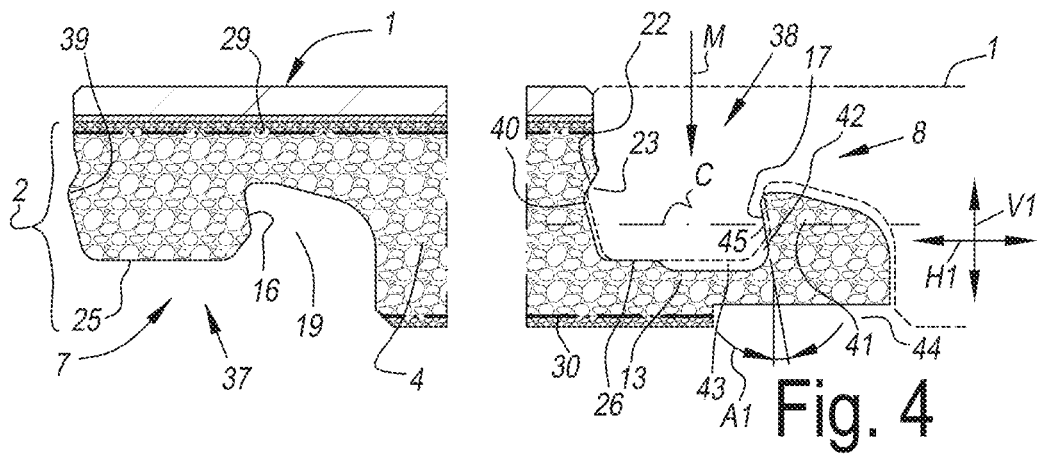
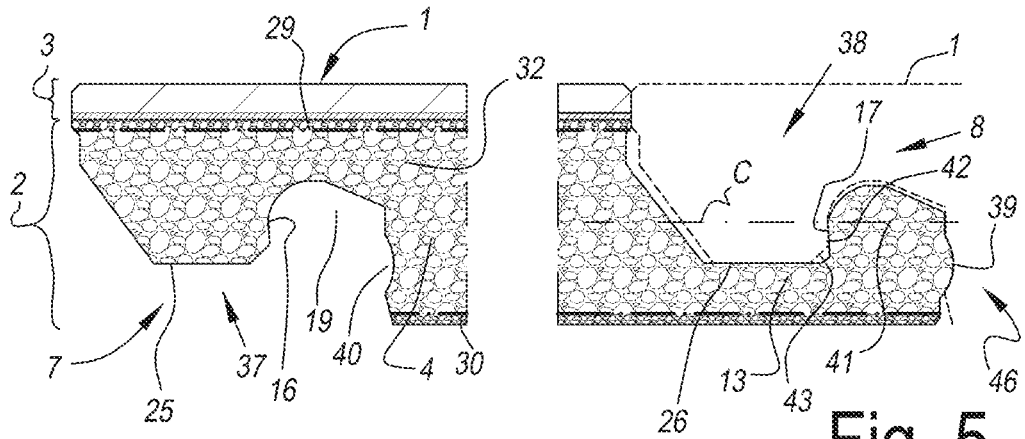
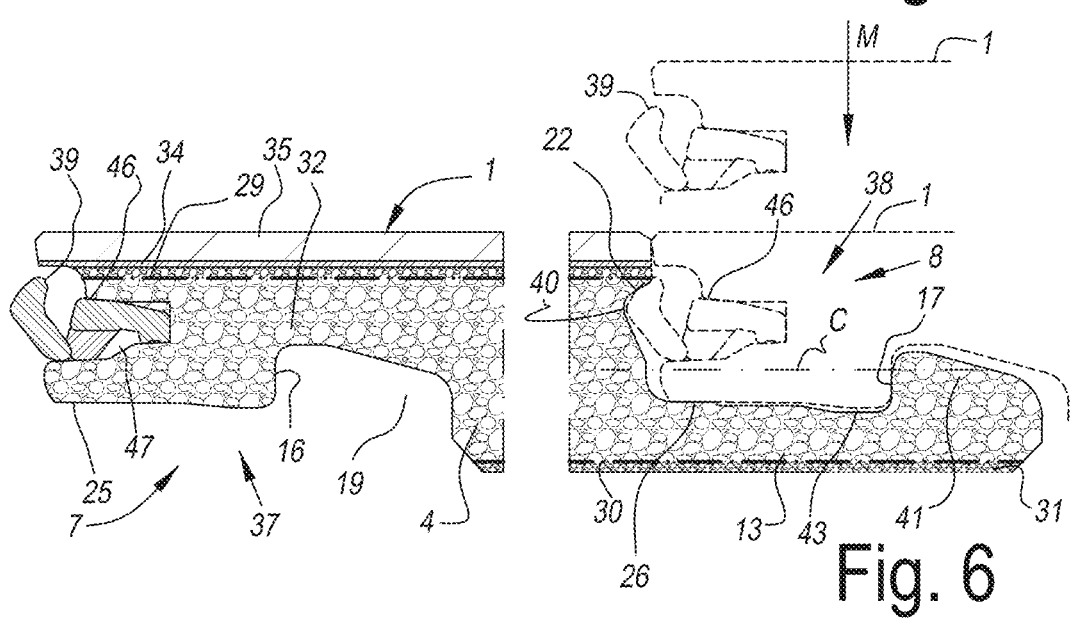

PANEL

CROSS REFERENCE

This application is a continuation of U.S. application Ser. No. 18/050,148, filed Oct. 27, 2022, which is a continuation of U.S. application Ser. No. 16/651,419, filed Mar. 27, 2020, now U.S. Pat. No. 11,525,268, which is a nationalization of PCT Application No. PCT/IB2018/057059, filed Sep. 14, 2018, which claims the benefit under 35 U.S.C. 119(e) to the U.S. provisional application 62/564,499 filed on Sep. 28, 2017.

BACKGROUND OF THE INVENTION

1. Field of the Invention

This invention relates to panels, more particularly to floor, wall and ceiling panels.

2. Related Art

More particularly, the invention relates to floor panels with a substrate and a provided thereon decorative top layer. Such floor panels are widely known as such, for example, from WO 97/47834. The floor panels disclosed there relate to, amongst others, floor panels with a core which substantially consists of a HDF board with a laminate layer directly pressed thereon, said laminate layer comprising one or more paper sheets impregnated in melamine resin, amongst which preferably also a paper sheet with a print in, for example, a wood or stone motif, namely a so-called decor paper.

It is known that the HDF substrate or the HDF core of such laminate panel is sensitive to moisture influences. An exposure to excessive moisture, for example, when wet-cleaning such floor, may result in excessive swelling of the substrate and warping of the decorative top layer, i.e., laminate layer. This then in its turn leads to accelerated wear of the surface. A change in relative air humidity in the room leads to expansion or shrinkage of the length and/or width of the panels, which makes it necessary to provide expansion joints at the edges of the floor and in the surface of large floor surfaces. From the state of the art, a plurality of solutions for one or more of these problems are known. From EP 2 248 665, a thermoplastic laminate plank is known which comprises a PVC substrate and a laminate layer provided thereon. From EP 1 938 963, a floor panel is known with a core of soft PVC, wherein the decorative top layer also is composed of PVC. Floor panels on the basis of thermoplastic materials are not or hardly influenced by moisture, but show the disadvantage that they expand and shrink under the influence of temperature changes. From WO 2016/156,506 a floor panel is known with a core of a fiber cement board. Such substrate shows an excellent dimensional stability under the influence of moisture and temperature. The weight of these boards leads to problems with packaging, ergonomics and the safety of marketing, and with installation. In particular with panels which are provided with mechanical coupling parts, such as in EP 1 875 011, damage may occur during installation. The panels are so heavy that when connecting the coupling parts, for example, when turning the coupling means into each other, undesired splitting forces may occur which can damage the coupling means and/or the substrate irreparably.

US 2017/268,118 discloses glass fiber-reinforced magnesium oxide board materials for the use in building applications.

SUMMARY OF THE DISCLOSURE

The present invention primarily aims at providing an alternative panel, more particularly floor, wall or ceiling panel, wherein a solution is offered for one or more of the problems with the panels of the state of the art.

To this aim, the invention, according to its first independent aspect, relates to a panel, more particularly a floor, wall or ceiling panel, wherein this panel comprises a core and a provided thereon decorative top layer, with the characteristic that the aforementioned core comprises a magnesium oxide ($MgO$ and/or $MgO_2$) based board material and wherein the aforementioned panel, on at least two opposite edges, is provided with mechanical coupling means allowing that two of such panels can be interlocked at the respective edges. Magnesium oxide-based board materials are dimensionally stable under the influence of moisture and temperature, but can be made more light-weight than fiber cement boards on the basis of Portland cement. By making use of such core or substrate, panels can be obtained with a more limited risk of damage during coupling of the mechanical coupling means. Such panels can be packed better and can be more ergonomic and safer in use.

It is clear that with the magnesium oxide-based board material preferably a board material is concerned which substantially is obtained from a watery slurry of magnesium oxide, wherein hardening takes place by means of a chemical reaction comparable to the hardening reaction of, for example, cement.

The magnesium oxide board material preferably forms at least half of the thickness of the panel and/or forms at least half of the weight of the panel. Preferably, the magnesium oxide board material forms the layer with the highest density in the panel.

Preferably, the magnesium oxide-based board material comprises fillers. As fillers, wood particles, cork particles, bamboo particles, hemp particles, flax shives or other vegetable particles can be applied. According to another example, lime, talc of other stone-like powder or flour can be applied as a filler. Of course, also a mixture of both types of fillers can be used.

Further, the magnesium oxide-based board material can also comprise reinforcement fibers, such as glass fibers, PVA fibers (polyvinyl alcohol) or cellulose fibers, which, preferably more or less uniformly, can be distributed in the board material. By this measure, the brittleness of such board material can be reduced.

Preferably, the magnesium oxide-based board material comprises at least a reinforcement layer, preferably a glass fiber layer of the woven or unwoven type. The presence of a glass fiber layer offers various advantages. By means of a glass fiber layer, an increased coherence of the magnesium oxide-based board material can be obtained. A glass fiber layer also allows to increase the impact resistance of the panel and increase the dimensional stability still more. It is clear that one or more of such reinforcement layers possibly can be embedded in the magnesium oxide board material together with separate reinforcement fibers. Preferably, the reinforcement layer relates to a glass fiber net with openings, such that the actual board material is continuous through these openings.

Preferably, the aforementioned reinforcement layer is situated off center from the thickness of the magnesium oxide-based board material. In this manner, an increased bending stiffness of the board material, and the panel, is obtained. Preferably, said reinforcement layer, on the side thereof directed away from the aforementioned center, is flanked by a layer of magnesium oxide-based material, or, in other words, the respective reinforcement layer is entirely embedded in the magnesium oxide board material. Preferably, said layer of magnesium oxide-based material, which is situated on the side of the reinforcement layer which is directed away from the center, is free from fillers or comprises less fillers than a central portion of said magnesium oxide-based board material, and/or comprises fillers with an average particle size which is smaller than the fillers in a central portion of said magnesium-oxide board material. By means of such embodiment, a better surface of the board material is obtained, such that the risk of unevennesses showing in the decorative top layer or in/on the underside of the panels will be restricted.

According to a particular embodiment, the panel comprises at least two of such reinforcement layers, which then preferably are situated on opposite sides of the center of said magnesium oxide-based board material, preferably with each time a layer of magnesium oxide-based material which is situated on that side of the respective reinforcement layer which is directed away from the center.

Preferably, the aforementioned mechanical coupling means are realized at least partially, and preferably entirely, in one piece with the aforementioned magnesium oxide-based board material.

The mechanical coupling means preferably are realized substantially as a tongue and groove connection, wherein the groove is bordered by an upper lip and a lower lip.

Preferably, the mechanical coupling means show one or a combination of two of more of the following characteristics, which each separately or in any combination offer interesting advantages:
  the characteristic that the coupling means offer a locking in horizontal direction H1 as well as in vertical direction V1;
  the characteristic that at least one pair of horizontally active locking surfaces of the coupling means is realized in the magnesium oxide-based board material;
  the characteristic that at least one pair of horizontally active locking surfaces of the coupling means is realized at least partially and preferably entirely in the magnesium oxide-based board material;
  the characteristic that one or more pairs of the vertically active locking surfaces are formed at least partially and preferably entirely from the magnesium oxide-based board material; the characteristic that the mechanical coupling means consist of milled profiles which, for at least 70 percent of their circumference, are provided in the magnesium oxide-based board material of the invention;
  the characteristic that the panels are rectangular and that a first pair of opposite edges as well as a second pair of opposite edges is provided with coupling means;
  the characteristic that the mechanical coupling means allow a coupling by means of a turning movement W along the respective edges and/or a horizontal shifting movement S of the edges towards each other and/or a downward-directed movement of a male coupling part, for example, having a tongue, into a female coupling part, for example, having a groove;
  the characteristic that the lower lip extends in horizontal direction to beyond the upper lip; the characteristic that in a coupled condition of two of such floor panels a tension force is obtained between the respective floor panels; herein the lower lip of the groove preferably is in a bent condition;
  the characteristic that the lower lip of the groove in a coupled condition is bent; the characteristic that the coupling means, on at least one pair of opposite edges, for example, on the long edges in the case of a rectangular and oblong panel, substantially are realized as a tongue and a groove, bordered by a lower lip and an upper lip, wherein the lower lip shows a standing portion which can cooperate with a locking groove realized on the lower side of the tongue.

In the case that one or more reinforcement layers are applied in the magnesium oxide-based board material, the panel preferably shows one or a combination of two or more of the following characteristics:
  the characteristic that the aforementioned reinforcement layer extends uninterruptedly in the lower lip; this embodiment is particularly interesting when a certain bendability of the lower lip is required during coupling and/or thereafter;
  the characteristic that the aforementioned reinforcement layer extends uninterruptedly in the tongue; this embodiment is particularly interesting with floor panels which have to be coupled by means of a turning movement, as the weight of the panels, amongst others, has an effect on the tongue; the glass fiber layer restricts the risk of damage at the tongue;
  the characteristic that the aforementioned reinforcement layer extends uninterruptedly in the upper lip; such embodiment is particularly interesting with coupling means which have to be coupled by means of a turning movement, as the weight of the panels, amongst others, has an effect on the upper lip; the glass fiber layer restricts the risk of splitting off or permanent deformation of the upper lip.

Preferably, said decorative top layer comprises at least a, preferably printed, decor. Such top layer can be obtained in various concrete ways, of which herein below some possibilities will be listed, as examples without any limitative character.

According to a first possibility, said decorative top layer comprises a carrier sheet printed with a decor. Herein, this may relate to a paper sheet or a plastic foil, such as a polyvinyl chloride (PVC) foil, a polyethylene terephthalate (PET) foil, a polypropylene (PP) foil, a polyurethane (PU) foil and the like. When this relates to a paper sheet, this preferably relates to a paper sheet which as such is provided, for example, is impregnated, with a synthetic material, such as with melamine resin, acrylate-based or acrylate-containing resin, PVC or PU. Such printed carrier sheet can either be bonded directly on the magnesium-based board material, or via one or more intermediate layers. The connection of the decorative top layer as a whole with the magnesium oxide-based board material preferably is obtained via a glue layer.

According to a second possibility, the aforementioned decorative top layer comprises a decor formed, more particularly printed, directly on the panel. Herein, this may relate to a print by means of an inkjet printer directly on the respective panel surface. Herein, the panel surface can consist of the, whether or not pre-treated, surface of the magnesium oxide-based board material. Such pre-treatment can comprise a grinding treatment and/or a treatment with a filler, such that possible pores in the surface are filled, and/or a treatment with an adherence agent for the inks, and/or a treatment with a primer layer for obtaining a uniform background color for the print.

According to a third possibility, the aforementioned decorative top layer comprises a wood veneer with a thickness of less than 2.5 millimeters, for example, of 1 millimeter or less, or a wooden layer with a thickness of 2 to 5 millimeters, for example, 2.5 to 3.5 millimeters.

According to a fourth possibility, the aforementioned decorative top layer comprises a linoleum layer, a cork layer, whether or not printed, a stone veneer layer, a ceramics layer or the like.

In the cases where the actual decoration is thin, such as with printed decors or wood veneer or other wood layers, the decorative top layer preferably comprises a transparent or translucent wear layer provided above the, possibly printed, decor. Such wear layer preferably comprises a transparent synthetic material, such as melamine, PVC, PU, lacquer, for example, lacquer on the basis of acrylate, and the like.

Preferably, the panel, at the side directed away from the decorative top layer, comprises a sublayer of a material which is softer than the aforementioned magnesium oxide-based board material. So, for example, the sublayer may be formed of cork or of a foamed synthetic material.

With the same purpose, however, according to a second independent aspect, the present invention also relates to a panel, more particularly floor, wall or ceiling panel, wherein this panel comprises a core and a provided thereon decorative top layer, characterized in that the aforementioned core comprises a mineral-based board material, wherein the aforementioned panel, on at least two opposite edges, is provided with coupling means which allow that two of such panels can be interlocked at the respective edges, and wherein the mineral-based board material comprises at least a reinforcement layer, for example, a glass fiber layer. It is clear that the panel of the second independent aspect can also show the characteristics of the first aspect of the invention and/or the preferred embodiments of the first aspect of the invention without therein necessarily applying a magnesium oxide-based board material. Instead of a magnesium oxide-based board material, also a gypsum-based or chalk oxide-based board material, or a cement-based board material can be applied, such as a board material based on Portland cement, for example, of the type known from the aforementioned WO 2016/156,506.

The panels of the second aspect may show, for example, one or a combination of two or more of the following characteristics:
  the characteristic that the aforementioned reinforcement layer is situated off center from the thickness of the mineral based-board material;
  the characteristic that the aforementioned reinforcement layer, on the side thereof directed away from said center, is flanked by a layer of mineral-based material;
  the characteristic that the aforementioned mineral-based board material comprises fillers, and that the aforementioned layer of mineral-based material is free from fillers or comprises less fillers than a central portion of said mineral-based board material, and/or comprises fillers with an average particle size which is smaller than the fillers in a central portion of said mineral-based board material;
  the characteristic that the panel comprises at least two such reinforcement layers, which preferably are situated on opposite sides of the center of said mineral-based board material; the characteristic that the aforementioned coupling means are realized at least partially, and preferably entirely, in one piece with the aforementioned mineral-based board material.

Preferably, the coupling means of the panels of the second aspect show one or a combination of two or more of the following characteristics, which each separately or in any combination offer interesting advantages:

the characteristic that the coupling means offer a locking in horizontal direction H1 as well as in vertical direction V1;
  the characteristic that at least one pair of horizontally active locking surfaces of the coupling means is realized in the mineral-based board material;
  the characteristic that at least one pair of horizontally active locking surfaces of the coupling means is realized at least partially and preferably entirely in the mineral-based board material;
  the characteristic that one or more pairs of the vertically active locking surfaces are formed at least partially and preferably entirely from the mineral-based board material;
  the characteristic that the mechanical coupling means consist of milled profiles, which for at last 70 percent of their circumference are provided in the mineral-based board material of the invention;
  the characteristic that the panels are rectangular and that a first pair of opposite edges as well as a second pair of opposite edges is provided with coupling means;
  the characteristic that the mechanical coupling means allow a coupling by means of a turning movement W along the respective edges and/or a horizontal shifting movement S of the edges towards each other and/or a downward-directed movement of a male coupling part, for example, with a tongue, up into a female coupling part, for example, with a groove; the characteristic that the lower lip extends in horizontal direction to beyond the upper lip; the characteristic that in a coupled condition of two of such floor panels a tension force is obtained between the respective floor panels; herein, the lower lip of the groove preferably is in a bent condition;
  the characteristic that the lower lip of the groove, in a coupled condition, is bent; the characteristic that the aforementioned reinforcement layer extends uninterruptedly in the lower lip; this embodiment is particularly interesting when a certain bendability of the lower lip is required during coupling and/or thereafter;
  the characteristic that the aforementioned reinforcement layer extends uninterruptedly in the tongue; this embodiment is particularly interesting with coupling means which have to be coupled by means of a turning movement, as the weight of the panels effects, amongst others, on the tongue; the glass fiber layer restricts the risk of damage to the tongue;
  the characteristic that the aforementioned reinforcement layer extends uninterruptedly in the upper lip; this embodiment is particularly interesting with coupling means which have to be coupled by means of a turning movement, as the weight of the panels effects, amongst others, on the upper lip; the glass fiber layer restricts the risk of splitting off or permanent deformation of the upper lip.

As aforementioned, the coupling means, on at least one pair of opposite edges, for example, on the long edges in the case of a rectangular and oblong panel, substantially are realized as a tongue and a groove, bordered by a lower lip and an upper lip, wherein the lower lip shows a standing portion which can cooperate with a locking groove realized on the lower side of the tongue. Preferably, the coupling means of the panels of the first and/or the second aspect further show one or a combination of two or more of the following characteristics, which each separately or in any combination offer an edge profile which is ideally suited for being applied in a floor panel with a core of mineral-based board material, such as a magnesium oxide-based board material. This relates to the following characteristics:

- the possible vertically active locking surfaces between the lower side of the tongue and the upper side of the lower lip are situated substantially, and in this case even entirely, on the protruding part of the lower lip, namely on that part of the lower lip which extends beyond the distal end of the upper lip. Preferably, in the coupled condition there is a space between the lower side of the tongue and the upper side of the lower lip, wherein this space preferably extends horizontally underneath the tongue at least from on the tip of the tongue to beyond the distal end of the upper lip. In this manner, the risk of breaking of the tongue when turning the tongue into the groove is minimized, whereas still a sufficient vertical locking is obtained; and/or
- the projection in the horizontal plane of the possible vertically active contact surfaces between the lower side of the tongue and the upper side of the lower lip shows a length which is at least 15%, and still better at least 20% or 25%, of the length of the protruding part of the lower lip; and/or
- the length of the protruding part of the lower lip is at least 80% of the thickness of the mineral-based board material and preferably is smaller than 130% of the thickness of the mineral-based board material; and/or
- the smallest width of the standing portion of the lower lip at the location of the horizontally active locking surfaces is at least 15% of the thickness of the mineral-based board material and still better at least 20% of the thickness of the mineral-based board material; and/or
- the lower lip of the groove shows a point or area where the remaining thickness of the lower lip is smallest, wherein the floor panel comprises a reinforcement layer which extends in the respective lower lip, and wherein said reinforcement layer, at the location of said point or area, is situated off center from the remaining thickness, preferably, such as here, closer to the upper side of the lower lip than to the lower side. In this manner, a very significant effect on the possible bending of the lower lip is obtained; and/or
- the upper lip shows a point or area, at the location of the vertically active locking surfaces, where the remaining thickness of the upper lip is smallest, wherein the floor panel comprises a reinforcement layer which extends in the respective upper lip, and wherein said reinforcement layer, at the location of said point or area, is situated off center from the remaining thickness, preferably, such as here, closer to the lower side of the upper lip than to the upper side. In this manner, a very significant effect on the possible bending of the upper lip is obtained The present invention is particularly interesting when it is applied for floor panels, as there the advantages, in particular the reduced sensitivity to moisture, of a mineral-based board material are most pronounced.

Of course, the invention is also of importance when applied in wall panels or ceiling panels, in particular due to the fire-retarding or fire-resistant features thereof. In particular, the more restricted weight of magnesium oxide board material is of importance for the installation, the packaging and/or the marketing in each application.

The reinforcement by means of one or more reinforcement layers is of particular importance in the application of wall panels, in particular with room-high wall panels, and with panels, for example, wall or floor panels, with a height, length, respectively, of 2 meters or more. In such cases, during installation due to small tolerance differences large pressures on the coupling means will occur, which can lead to irreparable or unworkable damage.

BRIEF DESCRIPTION OF THE DRAWINGS

With the intention of better showing the characteristics of the invention, herein below, as an example without any limitative character, some preferred embodiments are described, with reference to the accompanying drawings, wherein:

FIGS. 4 to 6, at a larger scale, represent a cross-section according to the line IV-IV represented in FIG. 1, however, for variants;

DETAILED DESCRIPTION OF PREFERRED EMBODIMENTS OF THE INVENTION

Figure 1:
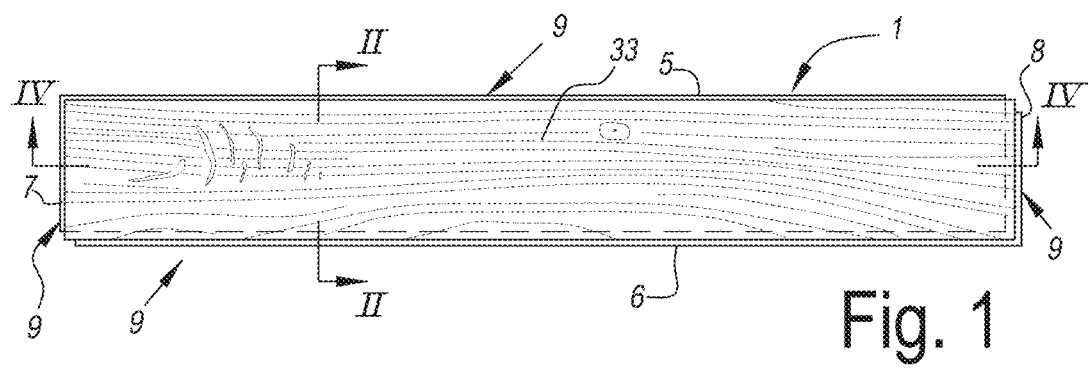
FIG. 1 represents a floor panel with the characteristics of the invention.

FIG. 1 represents a rectangular floor panel 1.

Figure 2:
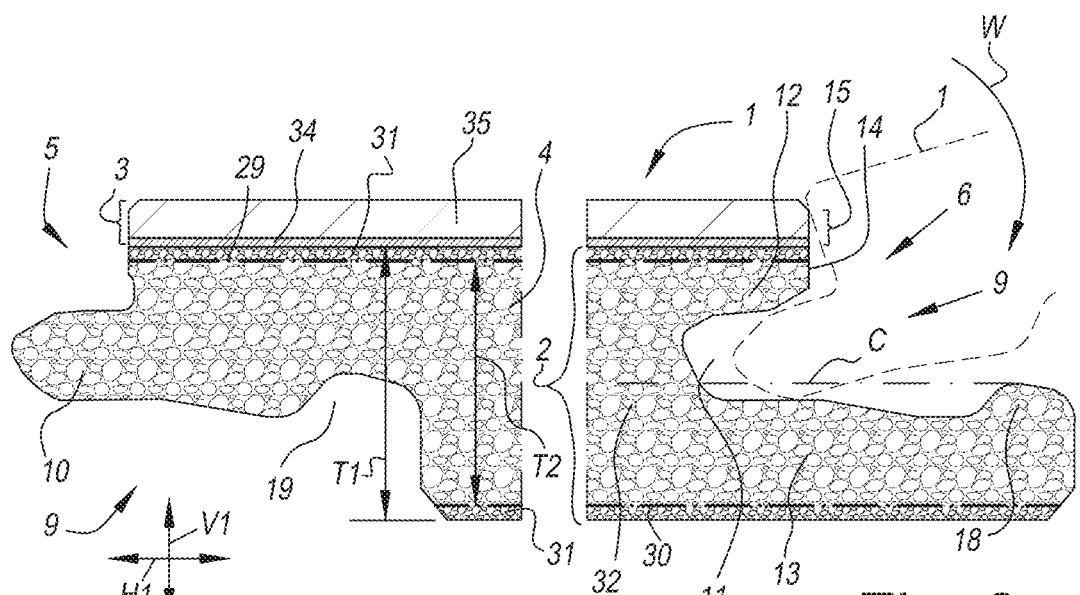
FIG. 2, at a larger scale, represents a cross-section according to the line II-II represented in FIG. 1.

FIG. 2 clearly shows that the floor panel 1 comprises a core 2 and a provided thereon decorative top layer 3.

The core 2 comprises a mineral-based board material, in this case a magnesium oxide-based board material 4, and, according to the invention, is provided on at least two opposite edges 5-6-7-8, and in this case on the pair of long opposite edges 5-6 as well as on the pair of short opposite edges 7-8, with mechanical coupling means 9.

Figure 3:
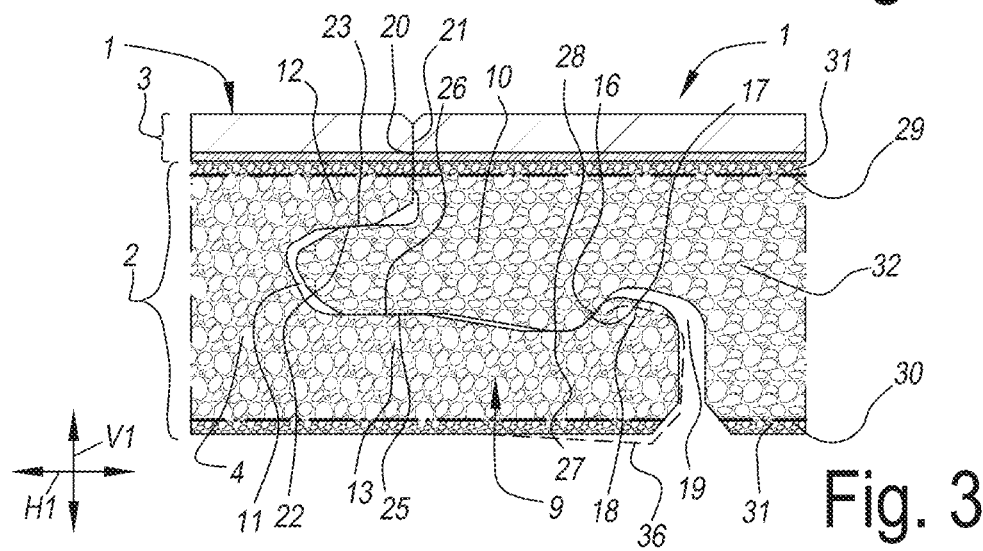
FIG. 3 represents the coupled condition of the coupling means illustrated in FIG. 2.

FIG. 2 clearly shows that the coupling means 9 on the long opposite edges 5-6 substantially are realized as a tongue 10 and a groove 11 with an upper lip 12 and lower lip 13. In this case, the aforementioned lower lip 13 extends in horizontal direction to beyond the distal end 14 of the upper lip 12. The represented coupling means 9 allow at least a coupling by means of a turning movement W along the respective edges 5-6. FIG. 3 shows that in the coupled condition a locking is obtained in horizontal direction H1 perpendicular to the coupled edges 5-6 and in the plane of the panels 1, as well as in vertical direction V1 perpendicular to the plane of the coupled panels 1. The coupling means 9 consist of milled profiles, which for at least 70 percent of their circumference are provided in the mineral-based board material 4. In this case, the coupling means 9 are provided practically entirely in the mineral-based board material 4 of the core 2, with the exception of the part 15 thereof formed on the decorative top layer 3.

FIG. 3 represents that at least one pair of horizontally active locking surfaces 16-17 of the coupling means 9 is realized in the mineral-based board material 4. Herein, this relates to a first pair of locking surfaces 16-17 formed on a standing locking portion 18 of the lower lip 13 and a cooperating therewith locking groove 19 on the lower side of the tongue 10. A second pair of horizontally active locking surfaces 20-21 is formed in the example on the decorative top layer 3, or the aforementioned circumference portion 15. Several pairs of the vertically active locking surfaces 22-23-24-25 are formed of the mineral-based board material 4. Herein, this relates at least to a first pair of vertically active locking surfaces 22-23 on the upper side of the tongue 10 and the lower side of the upper lip 12 of the groove 11, and at least a second pair of vertically active locking surfaces 25-26 on the lower side of the tongue 10 and the upper side of lower lip 13 of the groove 11. In the example of FIG. 3, the second pair of vertically active locking surfaces 25-26 is formed such that they extend at least horizontally at a position vertically underneath the aforementioned upper lip 12. In this case, also a third pair of vertically active locking surfaces 27-28 is formed in the proximity of the aforementioned first horizontally active locking surfaces 16-17.

FIGS. 2 and 3 clearly show that at least one, and in this case even a plurality of reinforcement layers 29-30 are applied in the mineral-based board material 4. A first reinforcement layer 30 extends uninterruptedly in the aforementioned lower lip 13; a second reinforcement layer 29 extends uninterruptedly in the aforementioned upper lip 12. The first and second reinforcement layers 29-30 thus are situated off center from the thickness T1 of the magnesium oxide-based board material 4. On the sides of the reinforcement layers 29-30 which are directed away from the center of the board material 4, they are each time flanked by a layer 31 of magnesium oxide-based material. In the example, these layers 31 show another composition than the central layer 32 of the magnesium oxide-based board material 4, for example, in that they do contain no or less fillers than the central layer 32 of the mineral-based board material 4.

It is clear that the core 2, or at least the central layer 32 thereof, preferably is positioned such that it is at least centrally present in the core 2, namely, on the central line C. In this case, the thickness T2 of the central layer 32, i.e., the layer between the two reinforcement layers 29-30, amounts to more than 40 percent of the thickness T1 of the core.

The aforementioned decorative top layer 3 comprises a printed motif 33 and represents a single wooden plank. The printed motif 33 is provided on a thermoplastic foil 34, namely, a PVC foil. The floor panel 1 further also comprises a translucent or transparent wear layer 35, which is provided above the aforementioned decoration or printed motif 33.

It is noted that, according to a not represented embodiment, a floor panel 1 according to the invention may show an additional layer on the lower side of the core 2. Herein, this preferably relates to a foam layer, for example, of cross-linked or crosslinked polyethylene (XPE), which is fixed to the lower side of the core 2 by means of glue, in particular is fixed to the layer 31 which flanks the reinforcement layer 30. In this case, this relates to a soft foam.

Further, it is noted that in the coupled condition of FIG. 3 a tension force can be obtained between the respective floor panels 1, more particularly at the location of the second pair of horizontally active locking surfaces 20-21, namely between the respective decorative top layers 3 on the upper edges of the coupled floor panels 1. In dashed line 36 in FIG. 3 is represented that such tension force can be obtained, for example, in that the lower lip 13 in the coupled condition is spring-deflected and in the coupled condition pushes against the tongue 10. Such pretension is known as such, for example, from WO 97/47834.

At the opposite short edges 7-8 of the floor panel 1 in the example of FIGS. 1 to 3 the same coupling means 9 are applied as at the long opposite edges 5-6.

FIG. 4 represents a variant wherein at the short edges 7-8 coupling means 9 are provided with a male part 37 and a female part 38, which allow coupling two of such floor panels 1 at the respective edges 7-8 by means of a downward movement M of the male part 37 in the female part 38, wherein in the coupled condition a locking in a horizontal direction H1 as well as in a vertical direction V1 is effected.

The combination of a turnable profile on the long edges 5-6, for example, according to FIGS. 2 and 3, and a downwardly coupleable profile at the short edges 7-8, for example, according to any of the FIGS. 4 to 6, leads to the creation of a floor panel 1 which can be coupled by means of a so-called fold-down movement. Herein, the long edges 5-6 are provided in each other by means of a turning movement W, wherein by this turning movement W at the short edges 7-8 a downward movement M is created, which provides the male part 37 present there in the female part 38.

The example of such downwardly coupleable profile represented here is made in one piece with the mineral-based board material 4 of the floor panel 1 and comprises, for effecting the locking, a cooperating snap hook 39 and undercut 40, as well as a hook-shaped part 41 on the lower lip 13, which in this case also shows an undercut 42. The undercut 42 on the hook-shaped part 41 is made such that it forms an angle A1 with the vertical of 1° to 10° and preferably approximately 5°. The locking groove 19, which cooperates with the aforementioned hook-shaped part 41, is positioned entirely underneath the reinforcement layer 29 at the upper surface.

The aforementioned cooperating snap hook 39 and undercut 40 in this case comprise vertically active contact surfaces 22-23, cooperating in the coupled condition, which are realized in the mineral-based board material 4 of the core 2. The horizontally as well as vertically active contact surfaces 16-17 of the hook-shaped part 41 are also realized entirely in the mineral-based board material 4 of the core 2.

The upper surface of the lower lip 13 consists entirely of the mineral-based board material 4 of the core 2. In coupled condition, the edge profiles also show vertically active contact surfaces 25-26 formed on this upper surface. Between these vertically active contact surfaces 25-26 and horizontally active contact surfaces 16-17, a space 43 is present. The uppermost reinforcement layer 29 extends in one piece over the aforementioned locking groove 19 at the lower side of the male coupling part 37.

At the lower side of the lower lip 13, a recess 44 is realized, which extends at least partially underneath the aforementioned space 43. It provides for a smoother coupling, even with the represented overlap 45 in the contours of the male coupling part 37 and the female coupling part 18 at the location of the horizontally active locking surfaces 16-17. The lowermost reinforcement layer 30 is removed at the location of the aforementioned recess 44. This does not necessarily have to be so. According to a not represented embodiment, the lowermost reinforcement layer 30 can extend in one piece above said recess 44.

FIG. 5 represents a variant of profiles which can be coupled into each other by a downward movement M, wherein the snap hook 39 is situated at the distal end 46 of the lower lip 13 of the female part 38, whereas the undercut 40 is provided in the male part 38. Here, too, the upper surface of the lower lip 13 is formed entirely from the mineral-based board material 4 of the core 2, and in coupled condition the edge profiles show vertically active contact surfaces 25-26 formed on this upper surface. Between these vertically active contact surfaces and horizontally active contact surfaces 16-17, a space 43 is present. The lowermost reinforcement layer 30 extends in one piece in the lower lip 13, and the uppermost reinforcement layer 29 extends in one piece over the aforementioned locking groove 19 at the lower side of the male coupling part 37.

In the example of FIG. 5, too, the hook-shaped part 41 is realized with an undercut 42, wherein this undercut 42 is realized such that it forms an angle A1 with the vertical of 1° to 10°, and preferably approximately 5°. It is evident that, in FIG. 4 as well as in FIG. 5, such undercut 42 at the location of the horizontally active contact surfaces 16-17 on the hook-shaped part 41 is not necessary and that as well contact surfaces can be used which are vertical or which are less steeply inclined than the vertical, for example, with an inclination wherein the respective contact surfaces enclose an angle with the horizontal of 45° to 90°.

FIG. 6 represents a variant of downwardly coupleable profiles, wherein the snap hook 39 is formed by a separate insert 46, which in this case is provided in the male part 37. Such separate insert 46 preferably is also formed of thermoplastic material, for example, at least from PVC or ABS (Acrylonitrile-butadiene-styrene), and in coupled condition preferably shows, such as here, a vertically active contact surface 22 with the mineral-based board material 4 of the female part 38. In this manner, a precise vertical positioning of the male part 37 in the female part 38 can be obtained. The aforementioned separate insert 46 is situated, in this example, in a seat 47 with walls, which are entirely formed from the mineral-based board material 4 of the core 2.

It is clear that the hook-shaped part 41, the cooperating therewith locking groove 19 on the lower side of the male part 37, respectively, extends in the examples of the FIGS. 4 to 6 each time up into the upper half of the core 2, thus, to above the level C.

Figure 7:
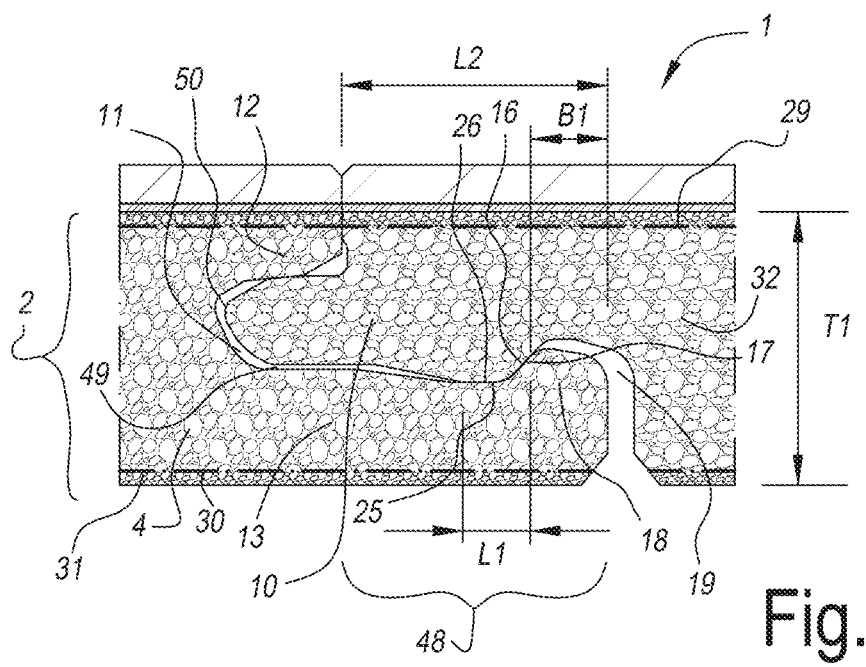
FIGS. 7 and 8, in a view similar to that of FIG. 3, represent variants.

FIG. 7 represents another variant, wherein the coupling means 9, for example, the coupling means 9 of the long opposite edges 5-6, show some preferred characteristics, which each separately or in any combination offer an edge profile which is ideally suited for being applied in a floor panel 1 with a core 2 of mineral-based board material 4, such as a magnesium oxide-based board material. This relates to the following characteristics:

the vertically active locking surfaces 25-26 between the lower side of the tongue 10 and the upper side of the lower lip 13 are situated substantially, and in this case even entirely, on the protruding part 48 of the lower lip 13, namely on that part of the lower lip 13 which extends to beyond the distal end of the upper lip 12. Preferably, in the coupled condition a space 49 is situated between the lower side of the tongue 10 and the upper side of the lower lip 13, wherein this space 49, such as here, extends horizontally underneath the tongue 10 at least from on the tip 50 of the tongue 10 up to beyond the distal end of the upper lip 12. In this manner, the risk of breaking of the tongue 10 when turning the tongue 10 into the groove 11 is minimized, whereas still a sufficient vertical locking is obtained; and/or the projection in the horizontal plane of the vertically active contact surfaces 25-26 between the lower side of the tongue 10 and the upper side of the lower lip 13 shows a length L1 which is at least 15%, and still better at least 20% or 25%, of the length L2 of the protruding part 48 of the lower lip 13; and/or the length L2 of the protruding part 48 of the lower lip 13 is at least 80% of the thickness T1 of the mineral-based board material 4 and preferably is smaller than 130% of the thickness T1 of the mineral-based board material 4; and/or the smallest width B1 of the standing portion 18 of the lower lip 13 at the location of the horizontally active locking surfaces 16-17 is at least 15% of the thickness T1 of the mineral-based board material 4 and still better at least 20% of the thickness T1 of the mineral-based board material 4.

Figure 8:
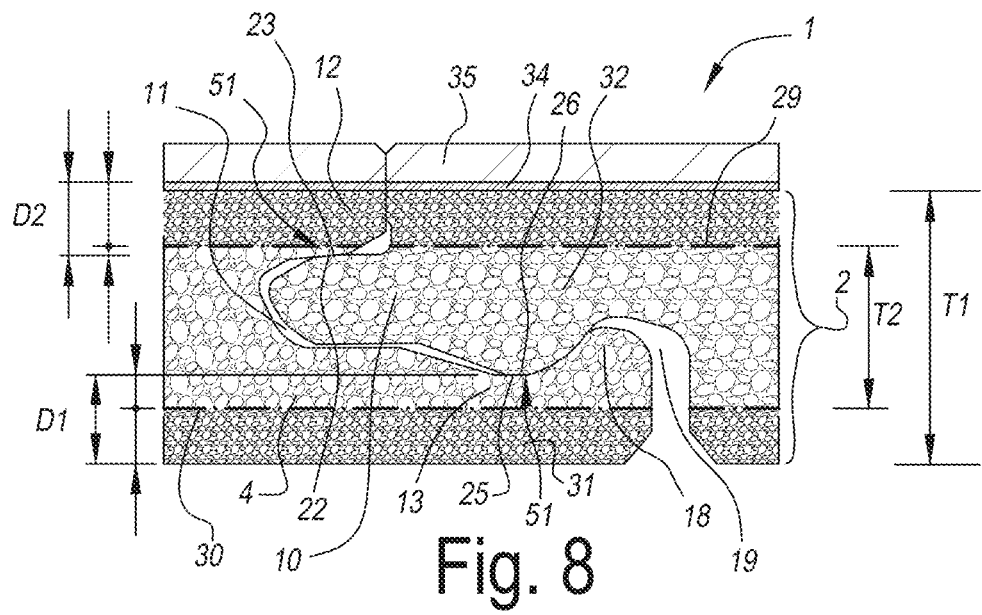

FIG. 8 represents another variant, wherein the coupling means 9, for example, the coupling means of the long opposite edges 5-6, show some preferred characteristics, which each separately or in any combination result in an edge profile which is ideally suited for being applied in a floor panel 1 with a core 2 of mineral-based board material 4, such as a magnesium oxide-based board material. This concerns, amongst others, the characteristics already mentioned in connection with FIG. 7, and the following characteristics, which, however, do not necessarily have to be applied in combination with those from FIG. 7:

the lower lip 13 shows a point 51 or area where the remaining thickness D1 of the lower lip 13 is smallest, wherein the floor panel 1 comprises a reinforcement layer 30 which extends in the respective lower lip 13, and wherein said reinforcement layer 30, at the location of said point 51 or area, is situated off center from the remaining thickness D1, preferably, such as here, closer to the upper side of the lower lip 13 than to the lower side. In this manner, a very significant effect on the possible bending of the lower lip 13 is obtained; and/or the upper lip 12 shows a point or area 52, at the location of the vertically active locking surfaces 22-23, where the remaining thickness D2 of the upper lip 12 is smallest, wherein the floor panel 1 comprises a reinforcement layer 29 which extends in the respective upper lip 12, and wherein said reinforcement layer 29, at the location of said point or area 52, is situated off center from the remaining thickness D2, preferably, such as here, closer to the lower side of the upper lip 12 than to the upper side. In this manner, a very significant effect on the possible bending of the upper lip 12 is obtained.

The present invention is in no way limited to the herein above-described embodiments, on the contrary can such panels be realized without leaving the scope of the present invention.

The invention claimed is:

1. A panel comprising a core and a decorative top layer provided thereon;

wherein the core comprises a first mineral-based board material layer, wherein the panel, on at least two opposite edges, is provided with coupling means arranged for two of such panels to be interlocked at the respective edges;

wherein the coupling means is arranged for locking in a horizontal direction and a vertical direction, the coupling means are formed as a tongue and groove connection such that the groove is bordered by an upper lip and a lower lip, the lower lip extending in the horizontal direction beyond the upper lip;

wherein the core comprises a lower mineral-based board material layer, wherein the lower mineral-based board material layer is provided at a side of the first mineral-based board material layer opposite from a side of the decorative top layer;

wherein the composition of the lower mineral-based board material layer differs from the composition of the first mineral-based board material layer;

wherein the core comprises an upper mineral-based board material layer, wherein the upper mineral-based board material layer is provided between the first mineral-based board material layer and the decorative top layer;

wherein the composition of the upper mineral-based board material layer differs from the composition of the first mineral-based board material layer.

2. The panel of claim 1, wherein the lower mineral-based board material layer comprises less fillers than the first mineral-based board material layer.

3. The panel of claim 1, wherein the lower mineral-based board material layer comprises fillers with an average particle size which is smaller than the fillers in the first mineral-based board material layer.

4. The panel of claim 1, wherein the upper mineral-based board material layer comprises less fillers than the first mineral-based board material layer.

5. The panel of claim 1, wherein the upper mineral-based board material layer comprises fillers with an average particle size which is smaller than the fillers in the first mineral-based board material layer.

6. The panel of claim 1, wherein the decorative top layer contacts the upper mineral-based board material layer.

7. The panel of claim 1, wherein the first mineral-based board material layer is a magnesium oxide-based material layer.

8. The panel of claim 1, wherein the lower mineral-based board material layer is a magnesium oxide-based material layer.

9. The panel of claim 1, wherein the upper mineral-based board material layer is a magnesium oxide-based material layer.

10. The panel of claim 1, wherein the groove is provided in the first mineral-based board material layer.

11. The panel of claim 1, wherein the upper lip is at least partially provided in the upper mineral-based board material layer.

12. The panel of claim 1, wherein the lower lip is at least partially provided in the lower mineral-based board material layer.

13. The panel of claim 1, wherein the decorative top layer comprises at least a printed decor.

14. The panel of claim 13, wherein the decorative top layer comprises a carrier sheet printed with a decor.

15. The panel of claim 14, wherein the carrier sheet comprises a paper sheet or a plastic foil.

16. The panel of claim 13, wherein the decorative top layer comprises a decor formed directly on the core or printed on the core.

17. The panel of claim 13, wherein a transparent or translucent wear layer is provided above the printed decor.

18. The panel of claim 1, wherein each of the first mineral-based board material layer, the upper mineral-based board material layer and the lower mineral-based board material layer comprise cellulose fibers or wood particles, or both.

19. The panel of claim 1, wherein the first mineral-based board material layer is thicker than the upper mineral-based board material layer and than the lower mineral-based board material layer.

20. A panel comprising a core and a decorative top layer provided thereon;

wherein the core comprises a first mineral-based board material layer, wherein the panel, on at least two opposite edges, is provided with coupling means arranged for two of such panels to be interlocked at the respective edges;

wherein the coupling means is arranged for locking in a horizontal direction and a vertical direction, the coupling means are formed as a tongue and groove connection such that the groove is bordered by an upper lip and a lower lip, the lower lip extending in the horizontal direction beyond the upper lip;

wherein the core comprises a lower mineral-based board material layer, wherein the lower mineral-based board material layer is provided at a side of the first mineral-based board material layer opposite from a side of the decorative top layer;

wherein the composition of the lower mineral-based board material layer differs from the composition of the first mineral-based board material layer;

wherein the core comprises an upper mineral-based board material layer, wherein the upper mineral-based board material layer is provided between the first mineral-based board material layer and the decorative top layer;

wherein the composition of the upper mineral-based board material layer differs from the composition of the first mineral-based board material layer;

wherein the first mineral-based board material layer is a magnesium oxide-based material layer;

wherein the lower mineral-based board material layer is a magnesium oxide-based material layer;

wherein the upper mineral-based board material layer is a magnesium oxide-based material layer;

wherein the groove is provided in the first mineral-based board material layer;

wherein the upper lip is at least partially provided in the upper mineral-based board material layer;

wherein the decorative top layer comprises at least a printed decor;

wherein each of the first mineral-based board material layer, the upper mineral-based board material layer and the lower mineral-based board material layer comprise cellulose fibers or wood particles, or both;

wherein the first mineral-based board material layer is thicker than the upper mineral-based board material layer and than the lower mineral-based board material layer.

\* \* \* \* \*